United States Patent
Schwarz et al.

(10) Patent No.: US 12,294,638 B2
(45) Date of Patent: May 6, 2025

(54) METHOD FOR MONITORING A RADIO FREQUENCY RECEIVER AND SEMICONDUCTOR DEVICE

(71) Applicant: Infineon Technologies AG, Neubiberg (DE)

(72) Inventors: Andreas Schwarz, Öpping (AT); Thomas Josef Bauernfeind, Arbing (AT); Stefan Schmalzl, Sauerlach (DE); Thomas Obermueller, Linz (AT); Martin Louda, Mokre (AT); Furqan Farooq Fazili, Linz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/359,065

(22) Filed: Jul. 26, 2023

(65) Prior Publication Data
US 2024/0039686 A1     Feb. 1, 2024

(30) Foreign Application Priority Data
Jul. 29, 2022    (DE) .......................... 102022207836.5

(51) Int. Cl.
*H04L 7/00*       (2006.01)
*H04L 7/033*       (2006.01)

(52) U.S. Cl.
CPC .......... *H04L 7/0008* (2013.01); *H04L 7/0087* (2013.01); *H04L 7/0334* (2013.01)

(58) Field of Classification Search
CPC .... H04L 7/0008; H04L 7/0087; H04L 7/0334
See application file for complete search history.

(56) References Cited

U.S. PATENT DOCUMENTS

2021/0190910 A1*   6/2021   Itkin .................... G01S 13/343
2022/0107385 A1    4/2022   Melzer et al.

* cited by examiner

*Primary Examiner* — Rahel Guarino
(74) *Attorney, Agent, or Firm* — Harrity & Harrity, LLP

(57) ABSTRACT

A method for monitoring an RF receiver includes generating of a digital test signal based on a signal, wherein the digital test signal includes a stream of digital test samples having a digital test sample; generating a monitoring signal based on the digital test signal; and coupling of the monitoring signal into a receiver path. The monitoring signal is processed in the receiver path to generate a processed monitoring signal and a stream of digital monitoring samples representing the processed monitoring signal. Information is determined indicating at least one property related to the receiver path based on a processing of a set of digital monitoring samples of the stream of digital monitoring samples. The set of digital monitoring samples includes a digital monitoring sample. The method further includes controlling the RF receiver such that the digital monitoring sample is generated a predetermined time duration after generating the digital test sample.

21 Claims, 11 Drawing Sheets

METHOD FOR MONITORING A RADIO FREQUENCY RECEIVER AND SEMICONDUCTOR DEVICE

CROSS REFERENCE TO RELATED APPLICATION

This application claims priority to German Patent Application No. 102022207836.5 filed on Jul. 29, 2022, the content of which is incorporated by reference herein in its entirety.

TECHNICAL FIELD

The present disclosure relates to monitoring a radio frequency receiver.

BACKGROUND

In RF devices such as radar MMICs (Monolithic Microwave Integrated Circuits), a reliable functioning of the device is for many applications of critical importance. For example, a failure of an automotive radar MMIC in an advanced driver assistance system (ADAS) may cause a control unit to receive no information from the car's radar sensor. In partially or fully automated driving systems, the failure of a radar MMIC may even lead to dangerous or uncontrollable situations.

Monitoring functionality is provided in many MMICs, such as automotive radar MMICs, in order to provide a guaranteed level of safety. The monitoring functionality may monitor parts of the RF MMICs which are critical for the functioning. For example, monitoring may be provided for a receiver path of a radar MMIC for obtaining information indicating whether the specific receiver path is functioning correctly or not. In order to obtain a high degree of certainty when performing monitoring, the monitoring should be able to achieve a high precision.

Henceforth, there is a necessity for an improved concept for providing monitoring of an RF receiver.

This is achieved by the subject matter of the independent claims of the disclosure. Further examples according to the disclosure are defined by the subject matter of the dependent claims of the disclosure.

SUMMARY

An aspect of the disclosure relates to a method for monitoring a radio frequency (RF) receiver. The method includes receiving a first signal and generating of a digital test signal based on the first signal, wherein the digital test signal includes a stream of digital test samples having a first digital test sample. Furthermore, the method includes generating a monitoring signal based on the digital test signal and the coupling of the monitoring signal into a receiver path. The monitoring signal is processed in the receiver path to generate a processed monitoring signal and a stream of digital monitoring samples representing the processed monitoring signal is generated. First information is determined indicating at least one property related to the receiver path based on a processing of a set of digital monitoring samples, wherein the set of digital monitoring samples includes a portion of the stream of digital monitoring samples and the set of digital monitoring samples includes a first digital monitoring sample. The method further includes controlling the receiver such that the first digital monitoring sample of the set of digital monitoring samples is generated a predetermined time duration after generating the first digital test sample of the stream of digital test samples.

In some examples, the stream of digital test samples includes a first sample rate and the stream of digital monitoring samples includes a second sample rate, wherein the first sample rate is higher than the second sample rate. The first sample rate may be an integer multiple of the second sample rate.

The predetermined time duration may be a predetermined integer multiple of the first time duration determined by a time interval between two consecutive digital monitoring samples. The first sample rate may correspond to a frequency of a first clock signal, and the method may include the generating of a reference signal based on the first signal. The controlling of the receiver further may include a generating of the first digital test sample of the stream of digital test samples concurrently or a predetermined first number of clock cycles of the first clock signal after generating the reference signal. The first digital monitoring sample may be generated a predetermined second number of clock cycles after the generating of the reference signal. The predetermined first number of clock cycles and the predetermined second number of clock cycles may be determined based on stored programmable information.

In some examples, the generating of the stream of digital monitoring samples may include generating a filter reset signal for resetting a decimation filter to define a time instant at which the first digital monitoring sample is generated. After resetting the decimation filter, a stream of digital receiver samples is received at the decimation filter, wherein the stream of digital receiver samples represents the processed monitoring signal. The decimation filter provides decimation of the stream of digital receiver samples to generate the stream of digital monitoring samples.

According to examples, the decimation filter is clocked with a first clock signal, and the filter reset signal is generated concurrently or a predetermined third number of clock cycles of the first clock signal after the generating of the reference signal.

In some examples, respective first clock cycles of the first clock signal at which the decimation filter is providing output samples are determined by the resetting of the decimation filter, the method further includes generating the first digital test sample of the stream of digital test samples a predetermined fourth number of clock cycles of the first clock signal after a predetermined clock cycle of the first clock cycles and generating the first digital monitoring sample of the stream of digital monitoring samples a predetermined fifth number of clock cycles after the generating of the first digital test sample of the stream of digital test samples.

According to examples, the first signal is generated by firmware and received by a hardware timing circuit, wherein the hardware timing circuit includes a first timer and a second timer. The method further includes starting the first timer based on the generating of the reference signal and starting the second timer based on the generating of the reference signal to generate a sampling start signal. The first digital monitoring sample is determined by the generation of the sampling start signal.

According to some examples, the method includes at least one of generating the monitoring signal based on digital-to-analog converting the digital test signal, wherein the monitoring signal is coupled into the receiver path downstream of a receiver mixer, or generating the monitoring signal based on digital-to-analog converting the digital test signal to an analog test signal and mixing the analog test signal with a local oscillator signal, wherein the monitoring signal is coupled into the receiver path upstream of a receiver mixer.

The method may further include generating a further digital test signal, the further digital test signal including a further stream of digital test samples, the further stream of digital test samples including a second digital test sample generating a further monitoring signal based on the further digital test signal; coupling the further monitoring signal into a further receiver path, processing the further monitoring signal in the further receiver path to generate a further processed monitoring signal and generating a further stream of digital monitoring samples representing the further processed monitoring signal. Second information is generated indicating at least one property related to the further receiver path based on a processing of a further set of digital monitoring samples, the further set of digital monitoring samples including a second digital monitoring sample of the further stream of digital monitoring samples. The generating of the second digital test sample is synchronized to the generating of the first digital test sample and the generating of the second digital monitoring sample is synchronized to the generating of the first digital monitoring sample. The first information may be compared with the second information.

According to examples, the first information may include at least one of phase information or a signal-to-noise information.

A further aspect of the present disclosure relates to a semiconductor device, including an RF receiver path, a digital signal generator for generating, based on a first signal, a digital test signal, the digital test signal including a stream of digital test samples with a first digital test sample. A monitor signal generator circuit is configured to generate a monitoring signal based on the digital test signal and a coupler is configured to couple the monitoring signal into the first receiver path. The first receiver path is configured to process the monitoring signal in the first receiver path and to generate a processed monitoring signal. A first circuit is provided to generate a stream of digital monitoring samples representing the processed monitoring signal. A processing element is provided to determine first information indicating at least one property related to the receiver path based on processing a set of digital monitoring samples from the stream of digital monitoring samples. The set of digital monitoring samples includes a first digital monitoring sample of the set of digital monitoring samples. Furthermore, a timing circuit is configured to control the semiconductor device such that the first digital monitoring sample of the set of digital monitoring samples is generated a predetermined time duration after generating of the first digital test sample of the stream of digital test samples.

In examples, a clock circuit is provided to generate a clock signal, wherein the timing circuit is further configured to generate, based on the first signal, a reference signal and wherein the semiconductor device is controlled to generate the first digital test sample of the stream of digital test samples concurrently or a predetermined first number of clock cycles of the clock signal after generating the reference signal and to generate the first digital monitoring sample a predetermined second number of clock cycles after generating the reference signal. The semiconductor device may include a programmable memory to store information, wherein the timing circuit is configured to determine the predetermined first number of clock cycles and the predetermined second number of clock cycles based on the stored information.

The first circuit may include a decimation filter, and the timing circuit may be configured to generate a filter reset signal for resetting the decimation filter to define a time instant at which the first digital monitoring sample is generated. The decimation filter may be configured to receive, after resetting the decimation filter, a stream of digital receiver samples, the stream of digital receiver samples representing the processed monitoring signal and to decimate the stream of digital receiver samples to generate the stream of digital monitoring samples.

In some examples, the decimation filter is clocked with a clock signal and the filter reset signal is generated concurrently or a predetermined third number of clock cycles of the clock signal after the generating of the reference signal.

In some examples, firmware is implemented in a processing unit of the semiconductor device to generate the first signal for starting a receiver monitoring, and wherein the timing circuit includes a first timer and a second timer, wherein the timing circuit is configured to start the first timer based on the generating of the reference signal and to start the second timer based on the generating of the reference signal to generate a sampling start signal, wherein the first digital monitoring sample is determined by the generation of the sampling start signal.

In some examples, the semiconductor device may include a further RF receiver path and the digital signal generator is configured to generate a further digital test signal which includes a further stream of digital test samples having a second digital test sample. The monitor signal generator circuit may further be configured to generate a further monitoring signal based on the further digital test signal. The semiconductor device may include a further coupler to couple the further monitoring signal into the further receiver path, wherein the further receiver path is configured to process the further monitoring signal in the further receiver path to generate a further processed monitoring signal. The first circuit may further be configured to generate a further stream of digital monitoring samples representing the further processed monitoring signal and the processing element may be configured to determine second information indicating at least one property related to the further receiver path based on processing a further set of digital monitoring samples from the further stream of digital monitoring samples, wherein the set of digital monitoring samples includes a second digital monitoring sample of the further stream of digital monitoring samples. The timing circuit is configured to control the digital signal generator such that generating the second digital test sample is synchronized to the generating of the first digital test sample and generating of the second digital monitoring sample is synchronized to the generating of the first digital monitoring sample.

BRIEF DESCRIPTION OF THE DRAWINGS

The drawings are not necessarily to scale, emphasis instead generally being placed upon illustrating the principles of the disclosure. The examples of the disclosure are illustrated by way of example and not by way of limitation in the figures of the accompanying drawings. In the following description, various examples of the disclosure are described with reference to the following drawings, in which.

DETAILED DESCRIPTION

Several examples of this disclosure are explained in the following with reference to the appended drawings. The scope of the disclosure is not limited only to the examples shown, which are meant merely for the purpose of illustration.

Examples of this disclosure address a new concept for monitoring RF receivers wherein a strict and predetermined synchronization is provided between the monitor signal coupled into one or more RF receiver paths and the generating of the digital samples representing the processed monitor signal provided to a processing unit to determine whether the RF receiver is functioning correctly. The present disclosure recognizes that in conventional systems the monitoring signals are started asynchronous to an output sample rate of the Digital Front End (DFE) circuit. The missing synchronization between the monitoring signal and the DFE output signal may result in a randomization of the start phases of the monitoring signals relative to the output samples of the Digital Front End circuit. If for example a digital test signal of 1 MHz is used for generating a baseband monitoring signal and a 200 MHZ clock is used for generating the digital test signal, a timing uncertainty of 1 clock cycle may lead to a phase uncertainty of already 8°. Specifically, if the digital front end block is providing a decimation of the received digital samples representing the processed signal, the timing uncertainty can increase significantly depending on the sample rate conversion which may resulting in a significant uncertainty of the phase of the monitoring signals. Since the phase behavior of an RF receiver is of significant importance for monitoring of RF MMICs such as radar MMICs, any uncertainty of the phase relation between the monitoring signal and the DFE output samples directly leads to a less precise and less reliable monitoring of the RF receiver. Examples of the present disclosure address this problem by providing a predictable time relation between the digital test signal and the output samples of the digital front end block which allows to achieve a repeatable and defined phase setting of the monitoring signal with respect to the DFE output samples.

Referring now to FIG. 1, a first example of an RF receiver 10A will be described. All elements of the RF receiver 10A may be implemented on a single semiconductor chip or within one semiconductor package as a MMIC. In some examples the RF receiver 10A may be a Radar receiver. The RF receiver 10A may be in some examples the receiver part of a transceiver.

Figure 1A:
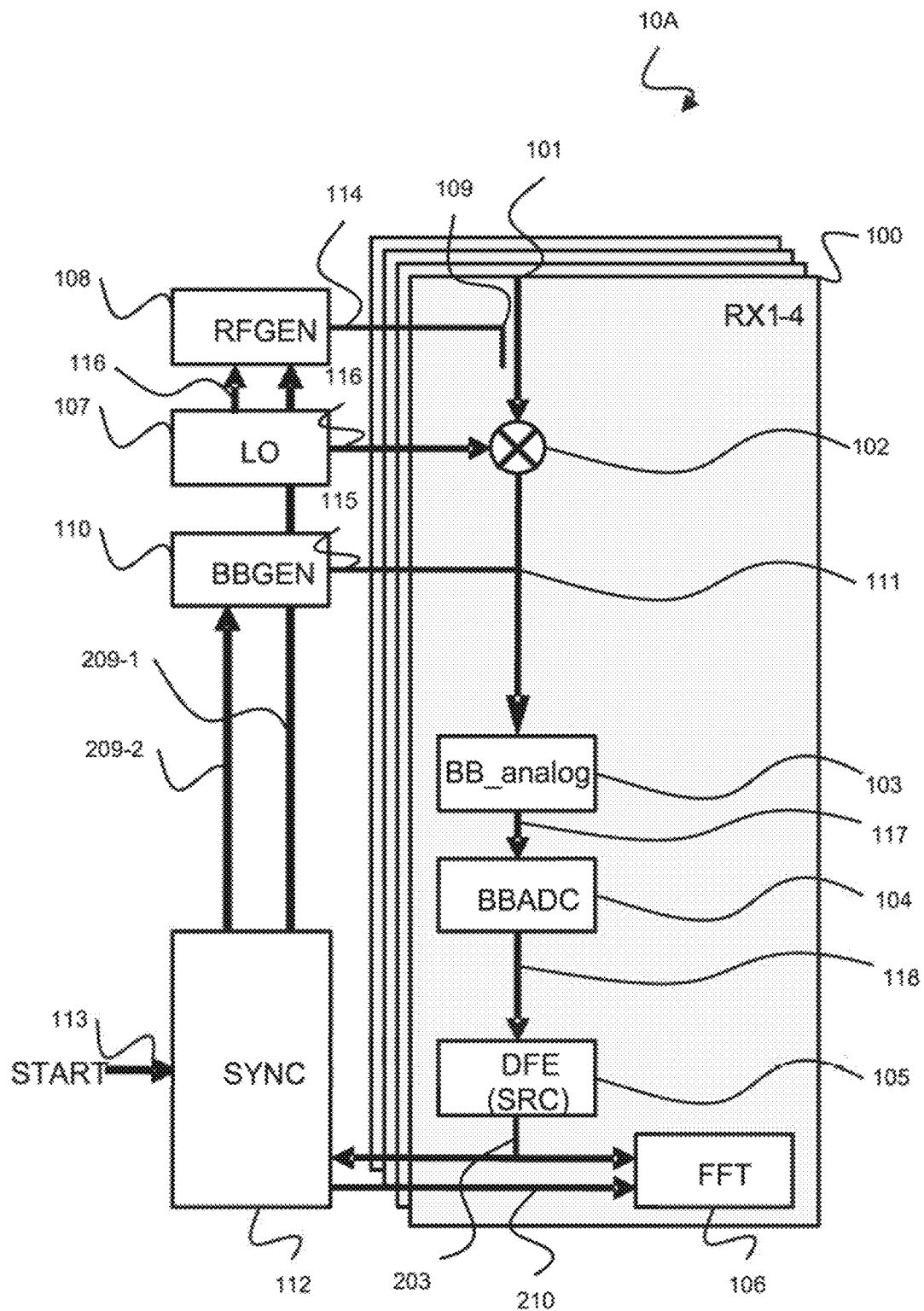
FIG. 1A shows a block diagram of an RF receiver according to an example.

The RF receiver 10A includes an RF receiver path 100 (sometimes referred to as receiver channel) connectable via an input 101 to an antenna. As can be seen in FIG. 1A, three other RF receiver paths are provided in addition to the RF receiver path 100 in order to form a plurality of RF receiver paths RX1-4. Multiple RF receiver paths 100 allow parallel processing of signals received at multiple antennas for example to enable MIMO operation. In examples described herein, the RF receiver paths 100 are of similar structure and function and therefore only the RF receiver path 100 will be explained in detail. However, in other examples the receiver paths may vary in structure or function or both.

An RF mixer 102 is provided to down-convert RF signals into baseband signals. A first input of the RF mixer 102 is connected to the input 101. A second input of the RF mixer 102 is coupled to an output of a local oscillator 107. The local oscillator 107 is configured to generate RF local oscillator signals 116 provided to the RF mixer 102. In some examples, the RF local oscillator signals 116 are in the range between 10 and 100 GHz, although the present disclosure is not limited thereto.

The baseband signal is processed in an analog baseband circuit 103 including for example analog filters, low-noise amplifiers etc. Processed baseband signals 117 are output from the analog baseband circuit 103 and provided to an analog-to-digital converter 104 to generate a stream of digital receiver samples 118 representing the processed baseband monitoring signal 117.

The analog-to-digital converter 104 is coupled to a digital front-end circuit 105 including a sample rate converter. The sample rate converter is configured to reduce the sampling rate and to output a stream of digital samples with decimated data which in the monitoring operation may be referred to as a stream of digital monitoring samples 203. To this end, the sample rate converter may utilize a decimation filter.

A monitoring circuit is provided in order to monitor the RF receiver path 100 and to determine a correct operation or a failure of the RF receiver path 100.

The monitoring circuit includes an RF monitoring signal generator 108 coupled upstream of the RF mixer 102 to the RF receiver path 100. The RF monitoring signal generator 108 is configured to generate an RF monitoring signal 114. The RF monitoring signal 114 is coupled into the RF receiver path 100 via an RF coupler 109 to monitor the RF part and the baseband part of the RF receiver path 100. RF coupler 109 may include for example a directional RF coupler. After coupling into the RF receiver path 100, the RF monitoring signal 114 is processed by the RF receiver path 100 as described above.

In order to generate the RF monitoring signal 114, the RF monitoring signal generator 108 is coupled to the local oscillator 107. Furthermore, the RF monitoring signal generator 108 may be configured to generate a digital test signal represented by a stream of digital test samples and to modulate a representation of the digital test signal onto the local oscillator signal. In some examples, the RF monitoring signal generator 108 may include a phase shifter or I-Q modulator in order to provide modulation of the local oscillator signal. The test signal modulated onto the RF local oscillator signal 116 may have a frequency in the baseband frequency range of the RF receiver path 100. For radar applications, the test signal may have a frequency to simulate a radar target at one or more specific ranges. In some examples, to generate the stream of digital test samples, the monitoring circuit may include a direct digital synthesizer (DDS) allowing generating arbitrary waveforms or multi-tone signals for the digital test signal.

The monitoring circuit further includes a baseband monitoring signal generator 110 to generate a baseband monitoring signal 115. The baseband monitoring signal 115 is coupled at a node 111 into the analog baseband circuit 103 to provide monitoring of the baseband part of the RF receiver path 100. Similar to the RF monitoring, the baseband monitoring signal 115 may be generated based on a stream of digital test samples provided by a direct digital synthesizer. The digital test samples may be provided to a digital-to-analog converter prior to the coupling into the baseband part of the RF receiver path 100. In some example, the digital test samples for the RF monitoring and the digital test samples for the baseband monitoring may be provided by a same digital signal generator.

A synchronization circuit 112 is provided in the MMIC in order to provide a synchronization between the test signals for RF or baseband monitoring and the output of the digital monitoring samples 203. The synchronization circuit 112 receives a first signal 113 indicating that a monitoring operation is to be start for the RF receiver path 100. The first signal 113 may be generated by firmware which may be implemented on the same MMIC. The firmware may be part of a controller firmware used on the MMIC to schedule time events such as starting an RF transmission, scheduling frequency ramps or scheduling a monitoring interval. Since firmware signals are generated by an execution of a program in which priorities, exceptions and other commands and operations may lead to an undefined output of the first signal 113, the exact timing of the appearance of the first signal 113 is not predictable on the scale of a system clock of the MMIC which may be generated by a clock circuit implemented on the MMIC. In other words, there is no hard synchronization between the first signal 113 and the digital monitoring samples 203 output by the digital frontend circuit 105. In consequence, while in one monitoring operation the first signal 113 may appear by chance at the same time at which a digital monitoring sample is generated, in the next monitoring operation the first signal may appear one or more clock cycles later or earlier.

A starting of the test signal generation synchronous to the first signal 113 leads therefore to random fluctuations of the phases of the test signals for RF or baseband monitoring.

In order to overcome the undetermined phase behavior of the test signals, the synchronization circuit 112 provides a synchronization between the generation of the test signals and the time at which the digital monitoring samples 203 are output by the digital front end circuit 105. In other words, the MMIC is controlled such that a digital monitoring sample of the digital monitoring samples 203 is generated a predetermined and reproducible time duration (for example a fixed number of clock cycles) after generating a specific sample of the digital test samples used for generating the monitoring signals.

According to the example of FIG. 1A, the synchronization circuit 112 is to this end connected to the RF monitoring signal generator 108 and the baseband monitoring signal generator 110 for providing signals 209-1 and 209-2. Furthermore, the synchronization circuit 112 is coupled to the digital front end 105 to receive a representation of the digital monitoring samples 203. As shown in FIG. 1A, the synchronization circuit 112 may also be coupled to a calculating unit 106 to control the start of an evaluation of a portion of the digital monitoring samples 203 for monitoring. The calculating unit 106 is coupled to the digital front end 105 to receive the stream of digital monitoring samples 203 and to calculate monitoring information therefrom. The calculating unit 106 may include at least one of a hardware calculation circuit, a processing unit, a state machine or any combination thereof. The calculating unit may be implemented in the MMIC and may provide monitoring information indicating whether the RF receiver path 100 is functioning correctly. To this end, the calculation unit 106 may calculate a spectral content of the stream of digital monitoring samples 203. In some example, the calculation unit may include a FFT machine or a Goertzel-filter. By comparing the result of the calculation with expected values such as characteristics of the test signal or predetermined thresholds, specific information as to whether the RF receiver path 100 is functioning correctly can be extracted. For example, parameters such as a phase information, an amplitude information or a signal to noise ratio can be calculated and information whether one of these parameters are exceeding the expected values can be extracted.

Figure 2A:
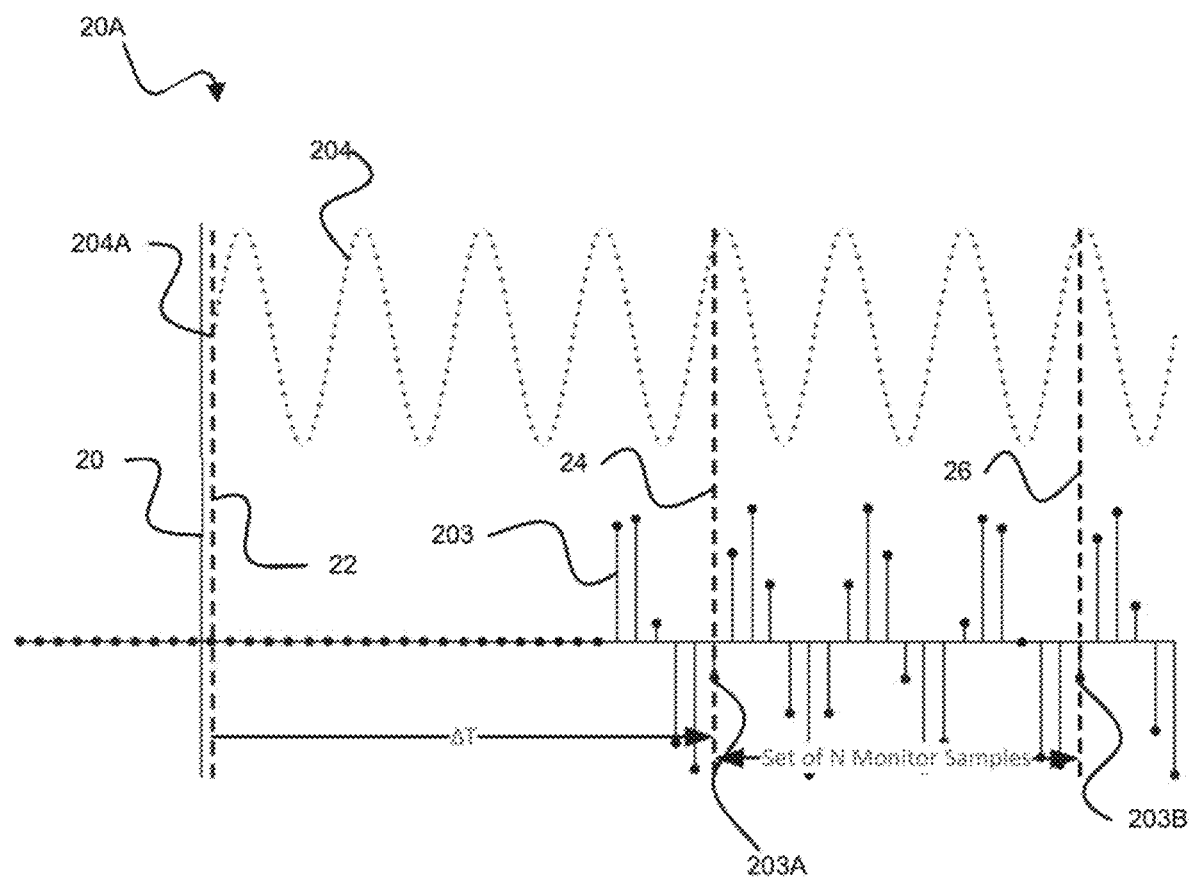
FIG. 2A shows a signal diagram over time according to an example.

Referring now to FIG. 2A, a timing diagram 20A of signals which may be used in the monitoring implemented in the example of FIG. 1A is shown with the abscissa showing time evolving from left to right. At a time instant 20, the first signal 113 indicating the start of the monitoring is received at the synchronization circuit 112. A stream of digital test samples 204 representing the digital test signal is generated based on the receiving of the first signal 113. A monitoring signal may be generated based on the digital test samples as described above. After coupling the monitoring signal into the RF receiver path 100, a stream of digital monitoring samples 203 is generated by the digital frontend circuit 105. Due to a decimation in the digital frontend circuit 105, the sample rate (samples per time unit) of the digital monitoring samples 203 may be lower than a sample rate of the digital test samples 204. In examples, the sample rate of the digital test samples 204 may be by an integer factor (e.g., factor 4) higher than the sample rate of the digital monitoring samples. A set of digital samples including a first digital monitoring sample 203A and a second digital monitoring sample 203B is selected between a first time instant 24 and a second time instant 26 and used to determine the at least one monitoring property of the RF receiver path 100.

The synchronization circuit 112 controls the generation of the test signals such that a first digital test sample 204A of the stream of digital test samples 204 is generated for each monitoring instance with a same time duration $\Delta T$ to the first digital monitoring sample 203A of the stream of digital monitoring samples 203. This achieves a defined time relation between the digital test signal and the stream of digital test samples 204. The first digital monitoring sample 203A may be the first sample in time of a set of digital samples used by the calculation unit 106 for calculating the monitoring information. However the first digital monitoring sample 203A defining the time interval $\Delta T$ can include in other examples any other digital sample of the stream of digital samples since the digital monitoring samples 203 are provided by the digital frontend circuit 115 in a regular and time-defined manner.

Figure 1B:
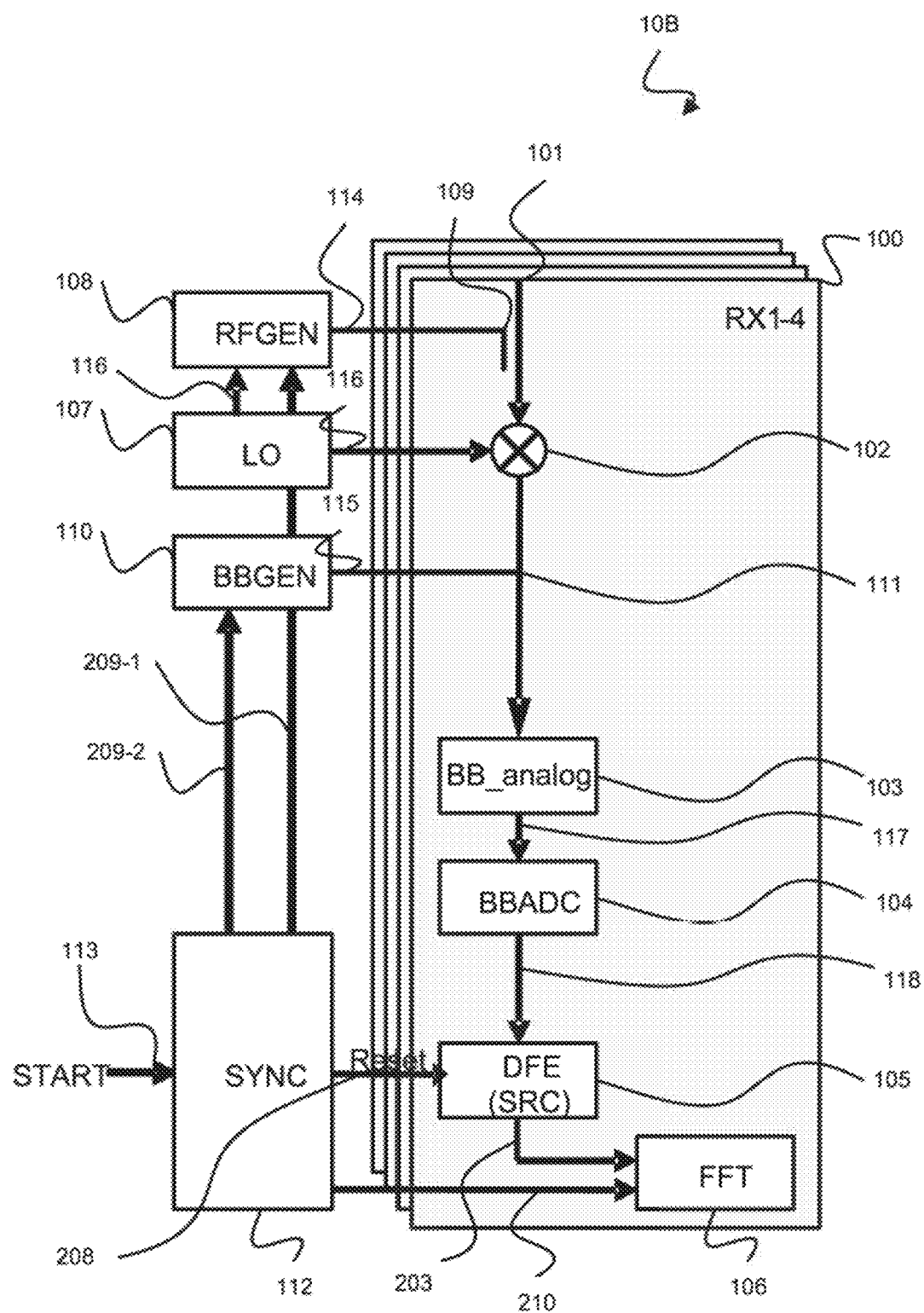
FIG. 1B shows a block diagram of an RF receiver according to an example.

Referring now to FIG. 1B, a further example of a RF receiver 10B of will be described. The example of FIG. 1B distinguishes from the example of FIG. 1A in that the generation of the stream of digital monitoring samples 203 is adjusted to achieve a predefined and reproducible phase relation with the stream of digital test samples 204. To achieve this, the synchronization circuit 112 is connected to the digital frontend circuit 105 to provide a reset signal. Upon the receiving of the reset signal, the digital front end will reset and provide a first output a predefined time after the reset. Accordingly with the generation of the reset signal, the time instant at which the digital samples of the stream of digital samples are generated can be controlled.

Figure 2B:
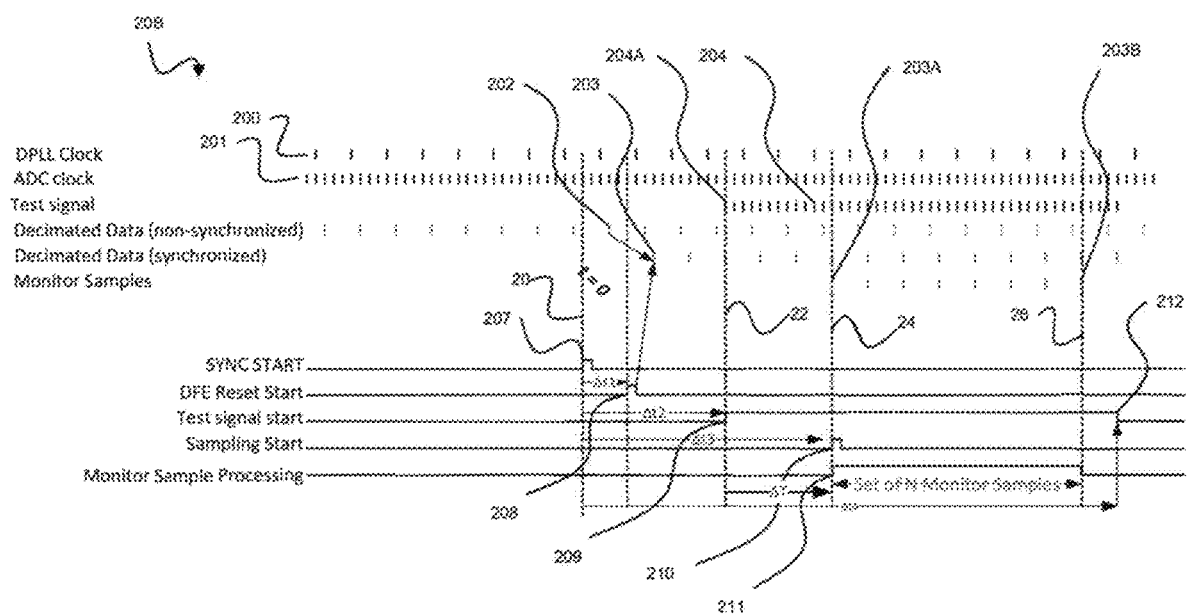
FIG. 2B shows a signal diagram over time according to an example.

FIG. 2B shows a timing diagram corresponding to an operation of the receiver 10B. At the time instant 20, the first signal 113 is received. As shown in FIG. 2B, the receiving of the first signal may be simultaneous with a clock tick (falling and/or rising edge of the clock signal) of an ADC clock signal 201 as the first signal is a digital signal and clocked by the clock signal. In examples ADC clock signal 201 may correspond to the system clock of the MMIC. However the exact clock tick, at which the first signal 113 appears is not predictable as outlined before. In view of this, the first signal 113 is not synchronized to the digital PLL output signal 200 and is also not synchronized to a stream of digital samples 202 (decimated digital output signal) output by the digital front end circuit 105 prior to the synchronization operation described herein. To achieve synchronization, a synchronization signal 207 is generated at the time instant 20. In some examples, the synchronization signal 207 may be generated one or more clock cycles after the receiving of the first signal 113, e.g., one or more clock cycles after the time instant 20.

A DFE reset signal 208 is generated a predetermined first time interval Δt1 after the generating of the synchronization signal 207. In the example of FIG. 2B, the first time interval is programmable and can for example be set to a programmed number of clock cycles, e.g., 5 clock cycles of the clock signal 201 as shown in FIG. 2B. The DFE reset signal 208 stops the output of the previously non-synchronized decimated digital samples 202 and starts the reset of the digital front end circuit 105 or parts of the digital front end circuit 105 (e.g., a decimation filter). Since the reset of the DFE requires for each reset operation the same amount of clock cycles until a new stream of digital monitoring samples 203 is provided, the resetting operation results in a predictable and repeatable time-relation of the new stream of digital monitoring samples 203 (herein also referred as the synchronized decimated digital output signal) with respect to the synchronization signal 207. In examples, the specific clock ticks (clock cycle numbers) of the clock signal at which the decimation filter of the digital front end circuit 105 is providing output samples is determined by the DFE reset signal 208. In the time diagram of FIG. 2B, the first digital monitoring sample of the stream of digital monitoring samples 203 is generated 8 clock ticks after the generation of the synchronization signal 207. However, this is only for illustration purpose and other numbers of clock ticks may be implemented.

A test start signal 209 is generated a second predetermined time interval Δt2 after the generation of the synchronization signal 207 at a time instant 22, for example 16 clock cycles after generation of the synchronization signal 207 as shown in FIG. 2B. The test start signal 209 triggers the generation of the stream of digital test samples 204 which starts by outputting the first digital test sample 204A. The stream of digital test samples 204 may be used to generate at least one of the RF monitoring signal 114 or baseband monitoring signal 115.

A predetermined third time interval Δt3 after the generating of the synchronization signal 207, a sampling start signal 210 is generated at a time instant 24. The sampling start signal 210 defines a set of N digital samples, herein also referred to as a set of N monitor samples, which are used in the monitor sample processing for determining a result of the monitoring. The set of N digital samples starts with the first digital monitoring sample 203A and ends with a last digital monitoring sample 203B at a time instant 26. The set of N digital samples therefore corresponds to a monitoring time interval 211 between the time instant 24 and a time instant 26. As described earlier, for providing monitoring results, the set of N digital samples may for example be Fourier-transformed utilizing an FFT engine or a Goertzel-Filter. At a time instant 212, the test start signal goes low and the generation of the digital test samples 204 is stopped.

Utilizing the above scheme, the generation of the stream of digital test samples 204 is synchronized to the stream of digital monitoring samples 203 since the time interval ΔT between the first digital test sample 204A and the first digital monitoring sample 203A is determined by the difference in the time intervals Δt3 and Δt2 which are both predictable and generated from a same time base, e.g., the synchronization signal 207. It is further to be noted that in some examples, the time interval ΔT is a predetermined integer multiple of a time interval between two consecutive digital monitoring samples, as shown in FIG. 2B.

A predetermined fourth time interval Δt4 after the generating of the synchronization signal 207, the test start signal 209 is no longer generated (set to logic 0) and the generation of the stream of digital test samples 204 is stopped.

Figure 3A:
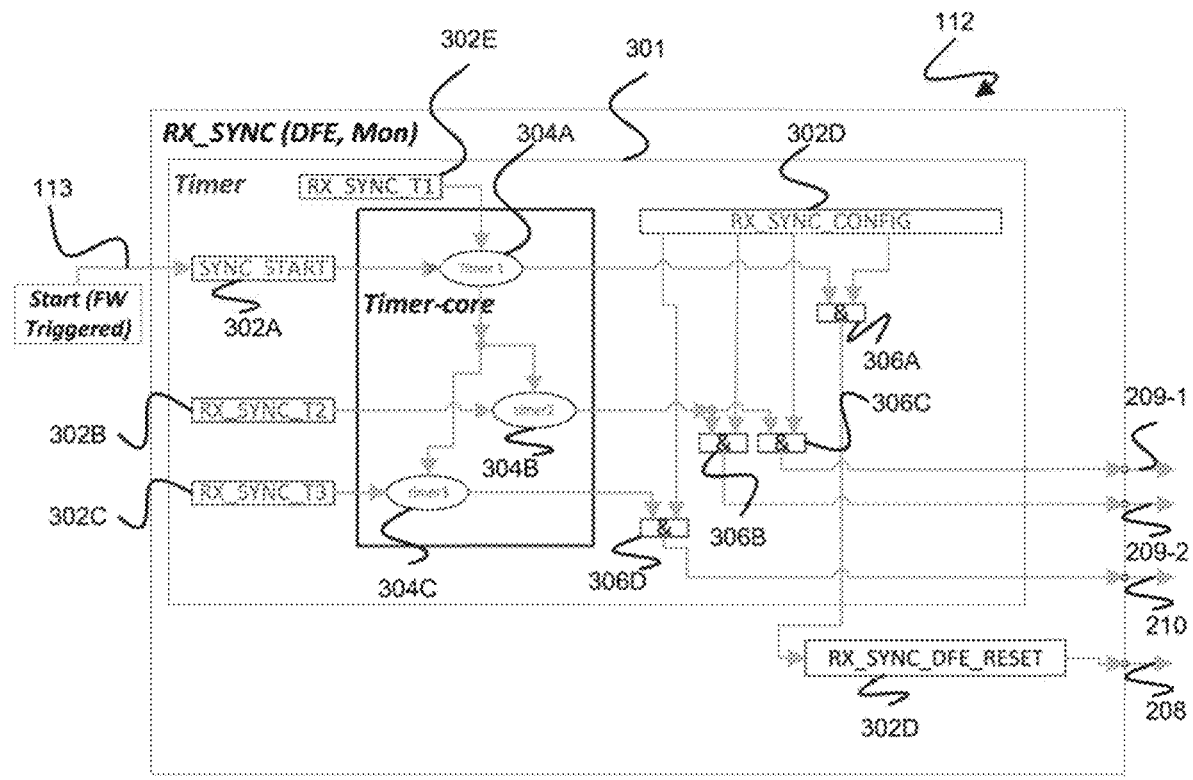
FIG. 3A shows a circuit block diagram according to an example.

FIG. 3A shows an example of the synchronization circuit 112 which may be used to provide synchronization as outlined in the timing diagram of FIG. 2B. The synchronization circuit 112 may be fully implemented in hardware and includes a timing circuit 301 including a digital data storage 302A. The data storage 302A is configured to receive the first signal 113 generated by firmware. The data storage 302A may be a programmable memory element, a buffer or any other storage element for storing digital data. The data storage 302A is connected to an input of a timer 304A of a timer core. The timer 304A is started based on the receiving of the first signal 113 at the data storage 302A. The timer is further connected to a data storage 302E which contains a programmable value determining the count value for the timer 304A. The timer 304A is further connected to an input of a timer 304B and an input of a timer 304C. The timer 304B is connected to a data storage 302B which contains a programmable value determining the count value for the timer 304B. The timer 304C is connected to a data storage 302C which contains a programmable value determining the count value for the timer 304C.

The timer 304A is connected to first input of a logic-AND element 306A and the timer 304B is connected to a first input of a logic-AND element 306B and a first input of a logic-AND element 306C. The timer 304C is connected to a first input of a logic-AND element 306D. Second inputs of the logic-AND elements 306A, 306B, 306C and 306D are connected to a data storage 302D containing configuration data for the monitoring operation. The configuration data stored in the data storage 302D may for example include first information identifying a particular RF receiver path to be monitored and second information identifying whether RF monitoring or baseband monitoring is to be performed.

An output of the logic-AND element 306A is connected to a data storage 302E provided for generating the DFE reset signal 208 based on a logic 1 provided to the data storage 302E. An output of the logic-AND element 306C is connected to an output for providing the signal 209-1 to the RF monitoring signal generator 108 in order to start the generating of the digital test samples 204. An output of the logic-AND element 306B is connected to an output for providing the signal 209-2 to the baseband monitoring signal generator 110 in order to start the generating of the digital test samples 204.

In operation, based on the receiving of the first signal 113 at the data storage 302A, the timer 304A will start counting a number of clock ticks as indicated by the programmable value stored in the data storage 302E defining the first time interval $\Delta t1$. When the count value is reached, a logic high is provided to start the timer 304B. Further a logic high is provided to the logic-AND element 306A. In case the first information stored in the data storage 302D indicates that the respective RF receiver path is to be monitored, the output of the logic-AND element goes high and the DFE start signal 208 is generated.

The timer 304B starts counting a number of clock ticks as indicated by the programmable value stored in the data storage 302B defining the second time interval $\Delta t2$. When the count value is reached, a logic high is output to the timer 304C. Further a logic high is provided to the logic-AND elements 306B and 306C. In case the first and second information stored in the data storage 302D indicates that for the respective RF receiver path a RF monitoring is to be performed, the output of the logic-AND element 306C goes high and the signal 209-1 is generated. Furthermore, in case the information stored in the data storage 302D indicates that for the respective RF receiver path a baseband monitoring is to be performed, the output of the logic-AND element 306B goes high and the signal 209-2 is generated.

After receiving the logic high signal from the timer 304B, the timer 304C starts counting a number of clock ticks as indicated by the programmable value stored in the data storage 302C defining the third time interval $\Delta t3$. When the count value is reached, a logic high is output to the logic-AND element 306D. In case the first and second information stored in the data storage 302D indicates that for the respective RF receiver path a monitoring is to be performed, the output of the logic-AND element 306D goes high and the sampling start signal 210 is generated. In view of the above it is to be noted that both the timer 304B and the timer 304C are started based on the generation of the first signal 113 by firmware which is received at the data storage 302A.

Using the logic-AND elements and the data storage 302D, the synchronization circuit 112 is capable to select specific RF receiver paths for monitoring. This allows generating digital test samples 204, monitoring signals and digital monitoring samples 203 for each selected RF receiver path in a synchronized way as outlined above ensuring a same phase relation for each of the RF receiver path. The monitoring of multiple RF receiver paths can be performed sequentially, for example. Monitoring information indicating at least one property related to a first selected RF receiver path may be compared to the monitoring information indicating at least one property of a second selected RF receiver path. The synchronization described in examples herein ensures a predetermined and repeatable phase relation between the digital test samples 204 and the digital monitoring samples 203 for all RF receiver paths allowing monitoring information such as phase information, amplitude information or signal-to-noise information not only to be compared to absolute thresholds but also between the different RF receiver paths.

Figure 1C:
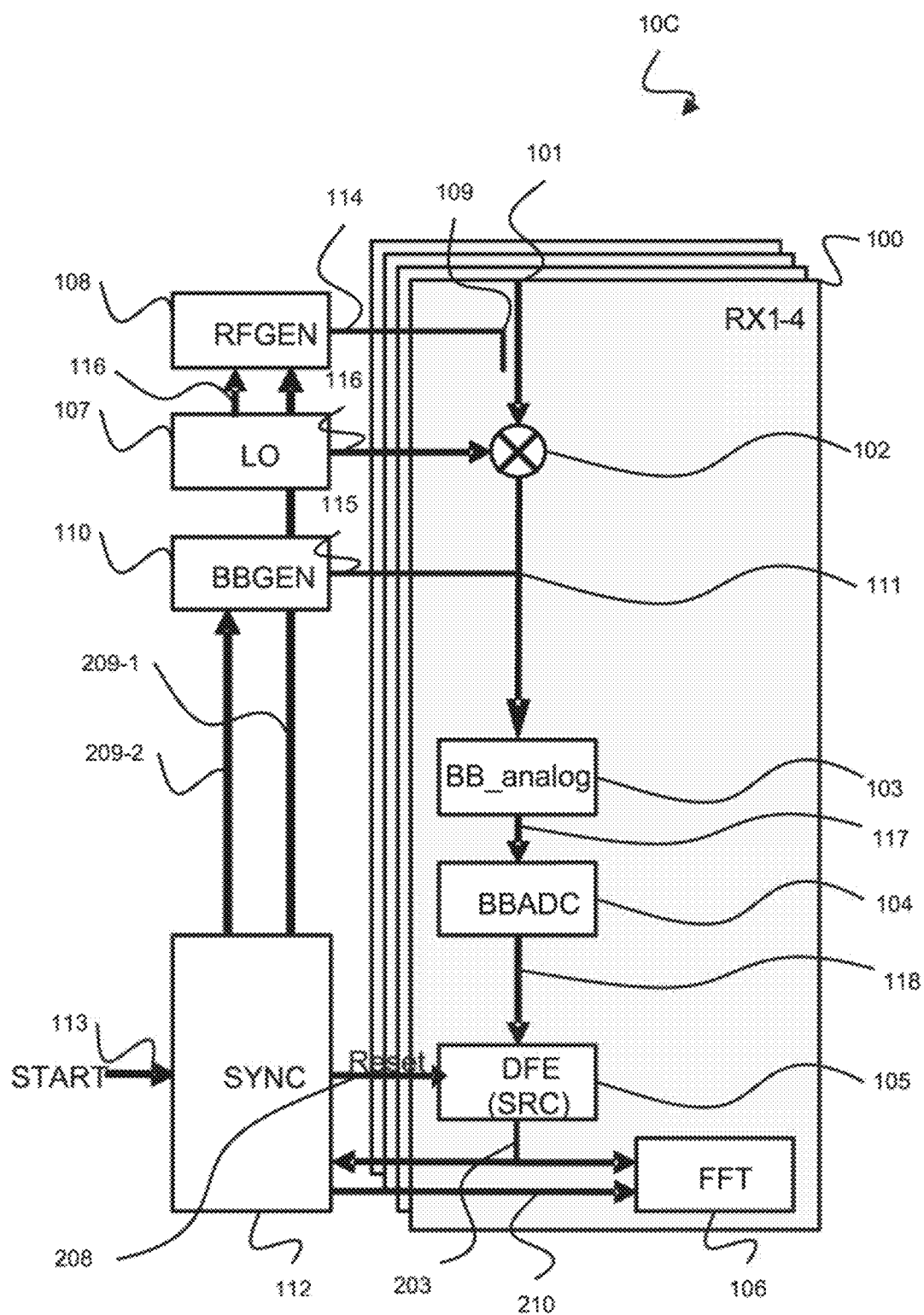
FIG. 1C shows a block diagram of an RF receiver according to an example.
Figure 2C:
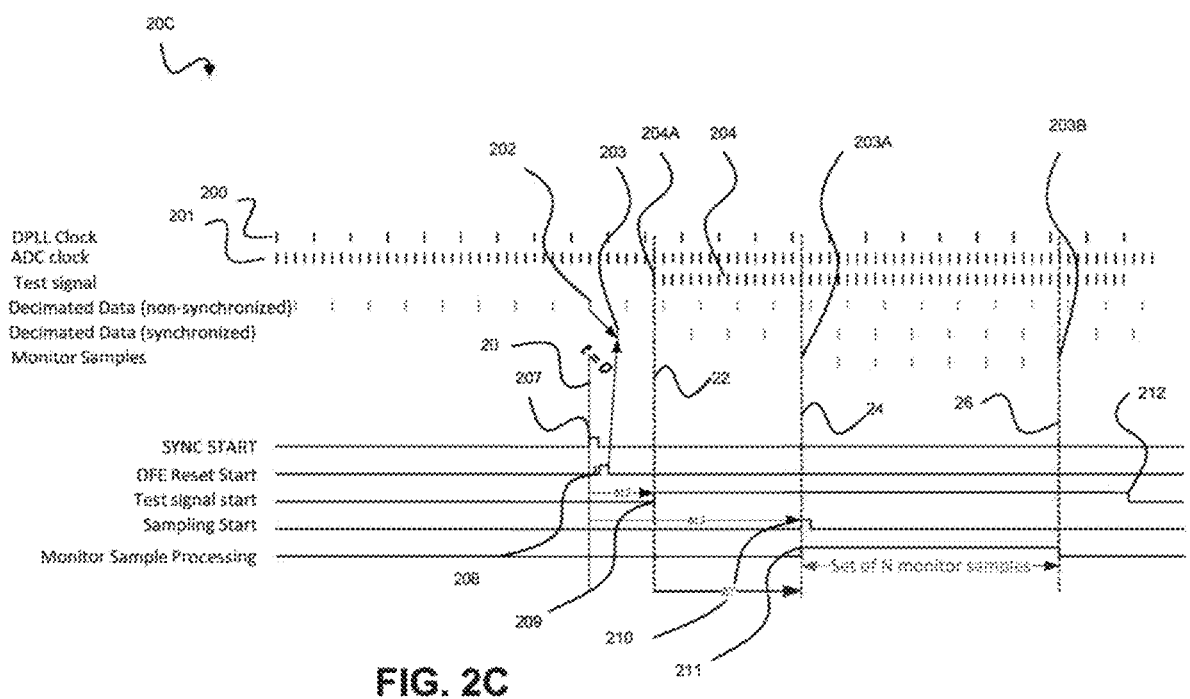
FIG. 2C shows a signal diagram over time according to an example.

Referring now to FIG. 2C, a further example of a timing diagram 20C of signals used in the monitoring implemented in the example of FIG. 1C will be described.

The timing diagram 20C distinguishes from the timing diagram 20B shown in FIG. 2B in that the generation of the DFE reset signal 208 relative to the synchronization signal 207 is fixed and not programmable. In FIG. 2C, the DFE reset signal 208 is generated always one clock cycle after the generation of the synchronization signal 207. However, in other examples the other examples the DFE reset signal may be generated more than one clock cycle after or concurrently with the generation of the synchronization signal 207.

All other signals are generated in a similar manner as already described above with respect to FIG. 2B and will therefore not be repeated. Reference is made to the above disclosure.

Figure 3B:
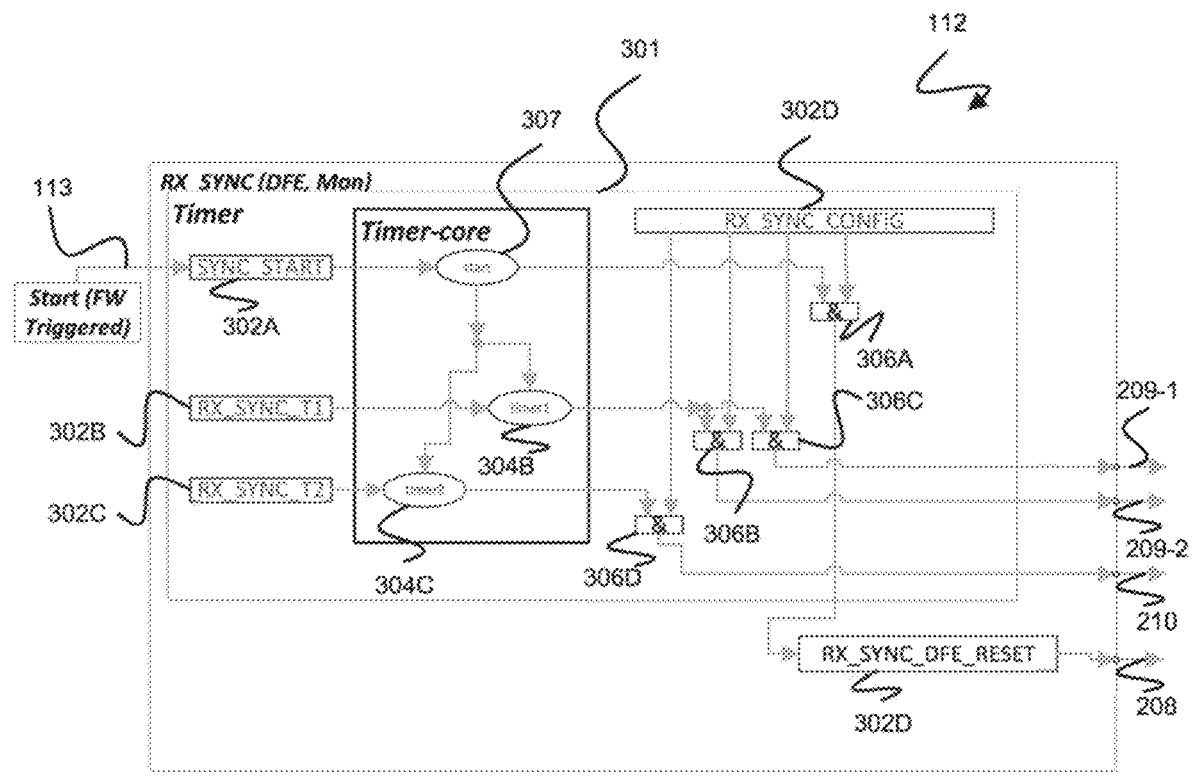
FIG. 3B shows a circuit block diagram according to an example.

FIG. 3B shows an example of the synchronization circuit 112 which may be used to provide synchronization as outlined in the timing diagram of FIG. 2C.

Compared to the circuit of FIG. 3A, it is to be noted that the timer 304A is replaced by a digital circuit element 307. The digital circuit element 307 is configured to generate a logic high one clock cycle after the first signal 113 is received in the data storage 302A. Similar to the circuit diagram of FIG. 3A, the digital circuit element 307 is connected to the inputs of the timers 304B and 304C and to the logic-AND element 306A. All other circuit elements and functionality of the circuit shown in FIG. 3B are similar and reference is made to the above disclosure.

Figure 2D:
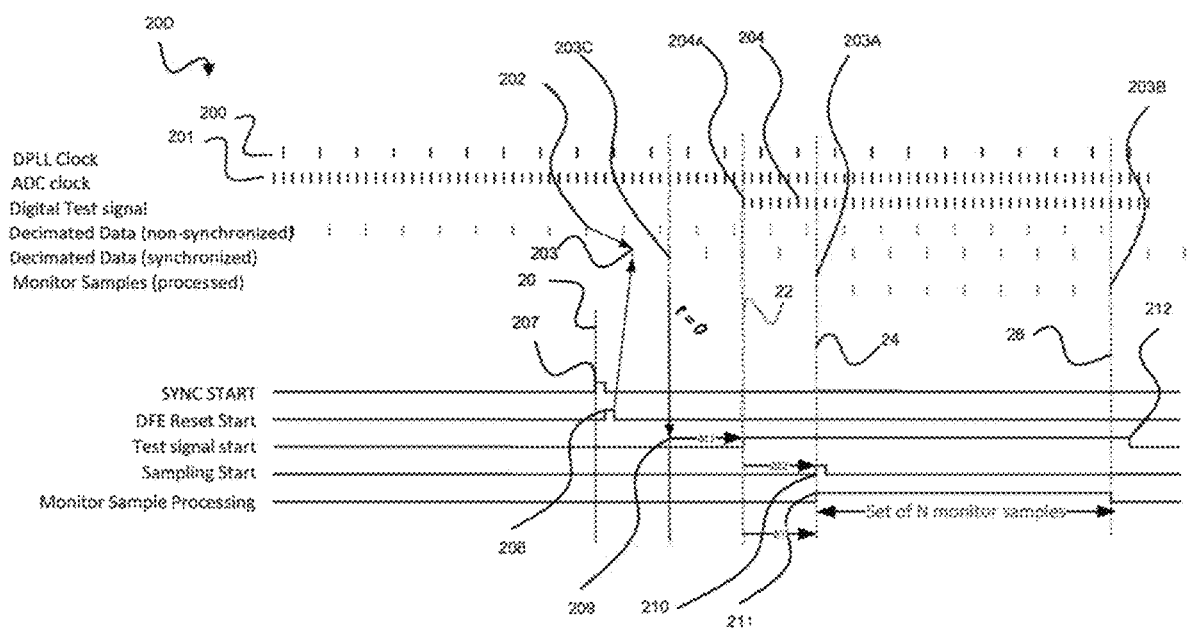
FIG. 2D shows a signal diagram over time according to an example.

Referring now to FIG. 2D, a further example of a timing diagram 20D will be described. The timing diagram 20D distinguishes from the timing diagrams 20B and 20C in that the time base for generating the first digital test sample 204A of the stream of digital test samples 204 is based on the stream of digital monitoring samples 203 generated after resetting the digital front end circuit 105. To this end, after the generating of the synchronization signal 207, the DFE reset signal 208 is generated. FIG. 2D shows the generation of the DFE reset signal 208 one clock cycle after the generating of the synchronization signal 207. It is to be noted however, that in this example the time interval between the synchronization signal 207 and the DFE reset signal 208 is not crucial and may be allowed to vary. After the generating of the DFE reset signal 208, the digital front end circuit 105 starts to generate the stream of digital monitoring samples 203. At this moment in time, no monitoring signal is injected into the RF receiver path 100 and the digital monitoring samples 203 contain no useful information at this time. A predetermined digital monitoring sample 203C will be used as a time reference for the generation of the further signals. The digital monitoring sample 203C can be determined by the specific number of digital samples when counting after the start of the stream of digital monitoring samples 203. In FIG. 2D, the digital monitoring sample 203C is the second sample in the stream of digital monitoring samples 203.

The digital monitoring sample 203C determines the generating of the test start signal 209 a predetermined time interval $\Delta t1$ after the digital monitoring sample 203C and can therefore be considered as the time base. It is to be noted that in this example the predetermined time interval $\Delta t1$ is determined based on a predetermined number of samples of the stream of digital monitoring samples 203 after the digital monitoring sample 203C, e.g., two samples as shown in FIG. 2D. In other examples the generation of the stream of digital test samples 204 may start concurrently with the digital monitoring sample 203C.

Accordingly, the stream of digital test samples 204 and the stream of digital monitoring samples 203 are synchronized. A second time interval $\Delta t2$ after the starting of the digital test signal 204, the sampling start signal 210 is generated. The generation of other signals shown in FIG. 2D is similar to the examples described in FIGS. 2B and 2C and will therefore not be repeated here. Reference is made to the above description of these elements.

Figure 3C:
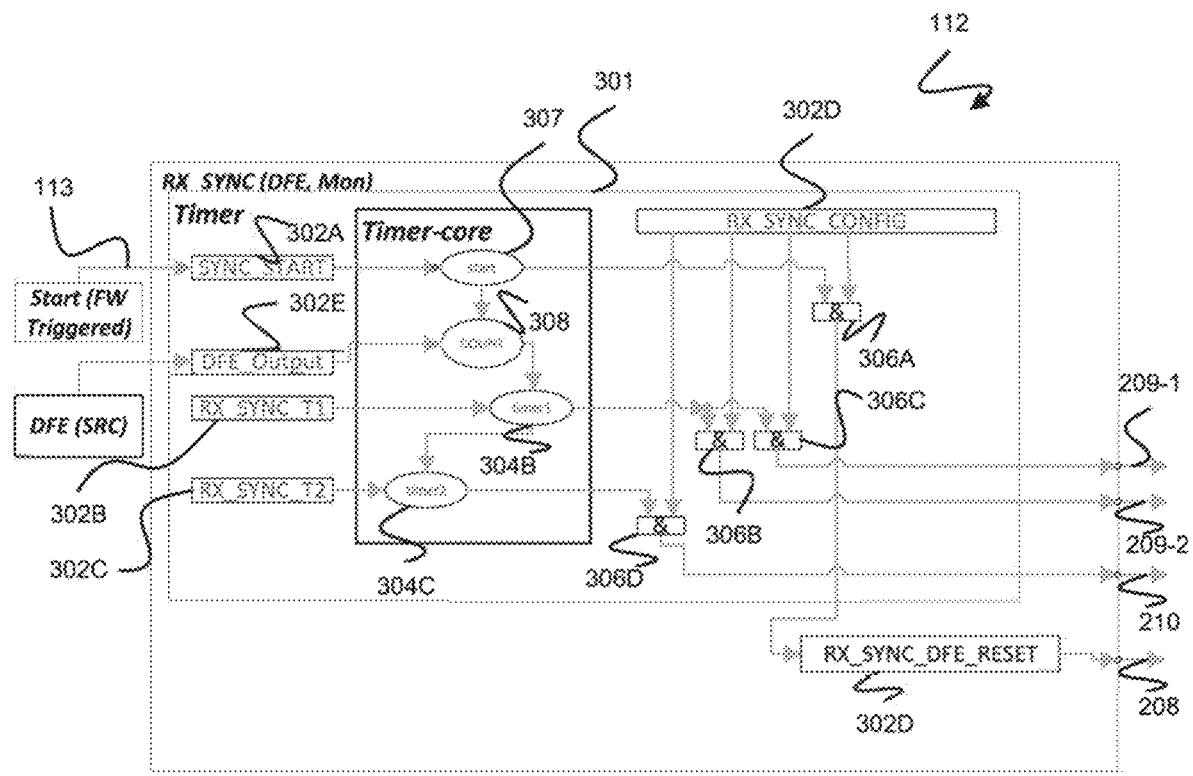
FIG. 3C shows a circuit block diagram according to an example.

FIG. 3C shows an example of the synchronization circuit 112 which may be used to provide synchronization as outlined in the timing diagram of FIG. 2D. The circuit of FIG. 3C distinguishes from the circuit of FIG. 3B in that an output of the digital circuit element 307 is connected to a counter 308. The counter 308 is connected to a data storage 302F which receives the digital monitoring samples 203 or a signal representing when the digital monitoring samples 203 are output. The digital circuit element 307 is configured to generate a signal at logic high one clock cycle after the first signal 113 is received in the data storage 302A. After the resetting of the digital front end circuit 105, the digital monitoring samples 203 are provided to the data storage 302F. The counter 308 counts the number of monitoring samples 203, for example by counting the number of times the value in the data storage 302F changes from low to high. When a number of monitoring samples corresponding to the predetermined value are provided, the output of counter 308 goes high and the timer 304B is started. All other circuit elements and functionality of the circuit shown in FIG. 3C are similar and reference is made to the above disclosure.

Figure 4:
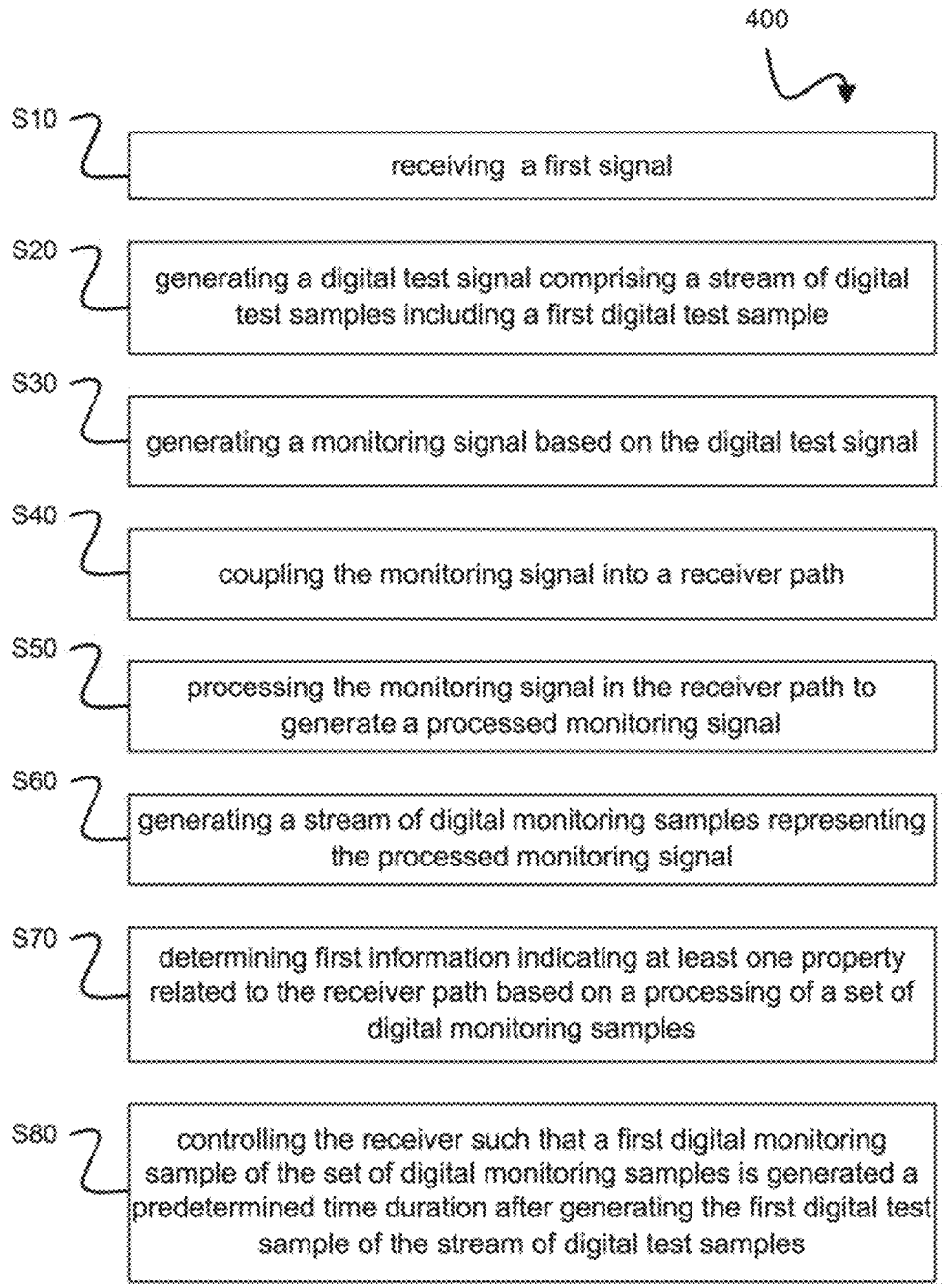
FIG. 4 shows a chart diagram according to an example.

FIG. 4 shows a chart diagram of the synchronization operation described in the examples herein. It is to be noted that the flow diagram is not intended to describe a particular order of the steps and two or more of the steps described in FIG. 4 may be exchanged.

With reference to S10, a first signal is received and a digital test signal comprising a stream of digital test samples including a first digital test sample is generated, S20. At S30, a monitoring signal is generated based on the digital test signal. The monitoring signal is coupled into a receiver path, S40, and the monitoring signal is processed in the receiver path to generate a processed monitoring signal, 550. A stream of digital monitoring samples representing the processed monitoring signal is generated, S60. The receiver is controlled such that a first digital monitoring sample of the set of digital monitoring samples is generated a predetermined time duration after generating the first digital test sample of the stream of digital test samples.

ASPECTS

In the following, the present concept will be further described using specific aspects.

Aspect 1 is a method for monitoring a RF receiver comprising: receiving a first signal; generating, based on the first signal, a digital test signal, the digital test signal comprising a stream of digital test samples, the stream of digital test samples comprising a first digital test sample; generating a monitoring signal based on the digital test signal; coupling the monitoring signal into a receiver path; processing the monitoring signal in the receiver path to generate a processed monitoring signal; generating a stream of digital monitoring samples representing the processed monitoring signal; determining first information indicating at least one property related to the receiver path based on a processing of a set of digital monitoring samples, the set of digital monitoring samples comprising a portion of the stream of digital monitoring samples, the set of digital monitoring samples comprising a first digital monitoring sample; and wherein the method comprises controlling the receiver such that the first digital monitoring sample of the set of digital monitoring samples (203) is generated a predetermined time duration after generating the first digital test sample of the stream of digital test samples.

Aspect 2 is the method of Aspect 1, wherein the stream of digital test samples comprises a first sample rate and the stream of digital monitoring samples comprises a second sample rate, wherein the first sample rate is higher than the second sample rate.

Aspect 3 is the method of Aspect 2, wherein the first sample rate is an integer multiple of the second sample rate.

Aspect 4 is the method of one of Aspects 1 to 3, wherein a first time duration is a time interval between two consecutive digital monitoring samples, and wherein the predetermined time duration is a predetermined integer multiple of the first time duration.

Aspect 5 is the method of one of Aspects 2 to 4, wherein the first sample rate corresponds to a frequency of a first clock signal, and the method further comprising: generating, based on the first signal, a reference signal; wherein controlling the receiver further comprises: generating the first digital test sample of the stream of digital test samples concurrently or a predetermined first number of clock cycles of the first clock signal after generating the reference signal; and generating the first digital monitoring sample a predetermined second number of clock cycles after generating the reference signal.

Aspect 6 is the method of Aspect 5, wherein the predetermined first number of clock cycles and the predetermined second number of clock cycles are determined based on stored programmable information.

Aspect 7 is the method of one of Aspects 1 to 6, wherein the generating of the stream of digital monitoring samples comprises: generating a filter reset signal for resetting a decimation filter to define a time instant at which the first digital monitoring sample is generated; after resetting the decimation filter, receiving at the decimation filter a stream of digital receiver samples, the stream of digital receiver samples representing the processed monitoring signal; and decimating, by the decimation filter, the stream of digital receiver samples to generate the stream of digital monitoring samples.

Aspect 8 is the method of Aspect 7, wherein the decimation filter is clocked with a first clock signal, wherein the filter reset signal is generated concurrently or a predetermined third number of clock cycles of the first clock signal after the generating of the reference signal.

Aspect 9 is the method of Aspect 8, wherein respective first clock cycles of the first clock signal at which the decimation filter is providing output samples are determined by the resetting of the decimation filter, the method further comprising: generating the first digital test sample of the stream of digital test samples a predetermined fourth number of clock cycles of the first clock signal after a predetermined clock cycle of the first clock cycles; and generating the first digital monitoring sample of the stream of digital monitoring samples a predetermined fifth number of clock cycles after the generating of the first digital test sample of the stream of digital test samples.

Aspect 10 is the method of one of Aspects 5 to 9, wherein the first signal is generated by firmware and received by a hardware timing circuit, the hardware timing circuit comprising a first timer and a second timer, the method further comprising: starting the first timer based on the generating of the reference signal; starting the second timer based on the generating of the reference signal to generate a sampling start signal, wherein the first digital monitoring sample is determined by the generation of the sampling start signal.

Aspect 11 is the method of one of Aspects 1 to 10, wherein the method comprises at least one of: generating the monitoring signal based on digital-to-analog converting the digital test signal, wherein the monitoring signal is coupled into the receiver path downstream of a receiver mixer; or generating the monitoring signal based on digital-to-analog converting the digital test signal to an analog test signal and mixing the analog test signal with a local oscillator signal; wherein the monitoring signal is coupled into the receiver path upstream of a receiver mixer.

Aspect 12 is the method of one of Aspects 1 to 11, wherein the method further comprises: generating a further digital test signal, the further digital test signal comprising a further stream of digital test samples, the further stream of digital test samples comprising a second digital test sample; generating a further monitoring signal based on the further digital test signal; coupling the further monitoring signal into a further receiver path; processing the further monitoring signal in the further receiver path to generate a further processed monitoring signal; generating a further stream of digital monitoring samples representing the further processed monitoring signal; determining second information indicating at least one property related to the further receiver path based on a processing of a further set of digital monitoring samples, the further set of digital monitoring samples comprising a second digital monitoring sample of the further stream of digital monitoring samples; and wherein the generating of the second digital test sample is synchronized to the generating of the first digital test sample and the generating of the second digital monitoring sample is synchronized to the generating of the first digital monitoring sample.

Aspect 13 is the method of Aspect 12 further comprising comparing the first information with the second information.

Aspect 14 is the method of one of Aspects 1 to 13, wherein the first information is at least one of phase information or a signal-to-noise information.

Aspect 15 is a semiconductor device comprising: a RF receiver path; a digital signal generator for generating, based on a first signal, a digital test signal, the digital test signal comprising a stream of digital test samples, the stream of digital test samples comprising a first digital test sample; a monitor signal generator circuit configured to generate a monitoring signal based on the digital test signal; a coupler configured to couple the monitoring signal into the first receiver path, wherein the first receiver path is configured to process the monitoring signal in the first receiver path and to generate a processed monitoring signal; a first circuit to generate a stream of digital monitoring samples representing the processed monitoring signal; a processing element to determine first information indicating at least one property related to the receiver path based on processing a set of digital monitoring samples from the stream of digital monitoring samples, the set of digital monitoring samples comprising a first digital monitoring sample of the set of digital monitoring samples; and a timing circuit configured to control the semiconductor device such that the first digital monitoring sample of the set of digital monitoring samples is generated a predetermined time duration after generating of the first digital test sample of the stream of digital test samples.

Aspect 16 is the semiconductor device of Aspect 15 further comprising a clock circuit to generate a clock signal, wherein the timing circuit is further configured to generate based on the first signal, a reference signal; and wherein the semiconductor device is controlled to generate the first digital test sample of the stream of digital test samples concurrently or a predetermined first number of clock cycles of the clock signal after generating the reference signal and to generate the first digital monitoring sample a predetermined second number of clock cycles after generating the reference signal.

Aspect 17 is the semiconductor device of Aspect 15 or 16 further comprising a programmable memory to store information, wherein the timing circuit is configured to determine the predetermined first number of clock cycles and the predetermined second number of clock cycles based on the stored information.

Aspect 18 is the semiconductor device of one of Aspects 15 to 17, wherein the first circuit comprises a decimation filter, wherein the timing circuit is configured to generate a filter reset signal for resetting the decimation filter to define a time instant at which the first digital monitoring sample is generated; and wherein the decimation filter is configured to receive, after resetting the decimation filter, a stream of digital receiver samples, the stream of digital receiver samples representing the processed monitoring signal and to decimate the stream of digital receiver samples to generate the stream of digital monitoring samples.

Aspect 19 is the semiconductor device of Aspect 18, wherein the decimation filter is clocked with a clock signal, wherein the filter reset signal is generated concurrently or a predetermined third number of clock cycles of the clock signal after the generating of the reference signal.

Aspect 20 is the semiconductor device of one of Aspects 16 to 19, further comprising firmware to generate the first signal for starting a receiver monitoring, and wherein the timing circuit comprises a first timer and a second timer, wherein the timing circuit is configured to start the first timer based on the generating of the reference signal and to start the second timer based on the generating of the reference signal to generate a sampling start signal, wherein the first digital monitoring sample is determined by the generation of the sampling start signal.

Aspect 21 is the semiconductor device of one of Aspects 15 to 20, comprising a further RF receiver path, wherein the digital signal generator is configured to generate a further digital test signal, the further digital test signal comprising a further stream of digital test samples, the further stream of digital test samples comprising a second digital test sample; wherein the monitor signal generator circuit is configured to generate a further monitoring signal based on the further digital test signal; the semiconductor device further comprising a further coupler to couple the further monitoring signal into the further receiver path, wherein the further receiver path is configured to process the further monitoring signal in the further receiver path to generate a further processed monitoring signal; wherein the first circuit is further configured to generate a further stream of digital monitoring samples representing the further processed monitoring signal; wherein the processing element is configured to determine second information indicating at least one property related to the further receiver path based on processing a further set of digital monitoring samples from the further stream of digital monitoring samples, the set of digital monitoring samples comprising a second digital monitoring sample of the further stream of digital monitoring samples; and wherein the timing circuit is configured to control the digital signal generator such that generating the second digital test sample is synchronized to the generating of the first digital test sample and generating of the second digital monitoring sample is synchronized to the generating of the first digital monitoring sample.

The invention claimed is:

1. A method for monitoring a radio frequency (RF) receiver, the method comprising:
    receiving a first signal;
    generating, based on the first signal, a digital test signal,
        wherein the digital test signal comprises a stream of digital test samples, and wherein the stream of digital test samples comprises a first digital test sample;
generating a monitoring signal based on the digital test signal;
coupling the monitoring signal into a receiver path;
processing the monitoring signal in the receiver path to generate a processed monitoring signal;
generating a stream of digital monitoring samples representing the processed monitoring signal;
determining first information indicating at least one property related to the receiver path based on a processing of a set of digital monitoring samples, wherein the set of digital monitoring samples comprises a portion of the stream of digital monitoring samples, and wherein the set of digital monitoring samples comprises a first digital monitoring sample; and
controlling the RF receiver such that the first digital monitoring sample of the set of digital monitoring samples is generated at a predetermined time duration after generating the first digital test sample of the stream of digital test samples.

2. The method according to claim 1, wherein the stream of digital test samples comprises a first sample rate and the stream of digital monitoring samples comprises a second sample rate, wherein the first sample rate is higher than the second sample rate.

3. The method according to claim 2, wherein the first sample rate is an integer multiple of the second sample rate.

4. The method according to claim 1, wherein a first time duration is a time interval between two consecutive digital monitoring samples, and wherein the predetermined time duration is a predetermined integer multiple of the first time duration.

5. The method according to claim 2, wherein the first sample rate corresponds to a frequency of a first clock signal, the method further comprising:
generating, based on the first signal, a reference signal, wherein controlling the RF receiver further comprises:
generating the first digital test sample of the stream of digital test samples concurrently with or a predetermined first number of clock cycles of the first clock signal after generating the reference signal; and
generating the first digital monitoring sample a predetermined second number of clock cycles of the first clock signal after generating the reference signal.

6. The method according to claim 5, wherein the predetermined first number of clock cycles and the predetermined second number of clock cycles are determined based on stored programmable information.

7. The method according to claim 1, wherein generating of the stream of digital monitoring samples comprises:
generating a filter reset signal for resetting a decimation filter to define a time instant at which the first digital monitoring sample is generated;
after resetting the decimation filter, receiving at the decimation filter a stream of digital receiver samples, the stream of digital receiver samples representing the processed monitoring signal; and
decimating, by the decimation filter, the stream of digital receiver samples to generate the stream of digital monitoring samples.

8. The method according to claim 7, wherein the decimation filter is clocked with a first clock signal, wherein the filter reset signal is generated concurrently with or a predetermined first number of clock cycles of the first clock signal after generating a reference signal.

9. The method according to claim 8, wherein respective first clock cycles of the first clock signal at which the decimation filter is providing output samples are determined by the resetting of the decimation filter, the method further comprising:
generating the first digital test sample of the stream of digital test samples a predetermined second number of clock cycles of the first clock signal after a predetermined clock cycle of the respective first clock cycles; and
generating the first digital monitoring sample of the stream of digital monitoring samples a predetermined third number of clock cycles after generating the first digital test sample of the stream of digital test samples.

10. The method according to claim 5, wherein the first signal is generated based on firmware and received by a hardware timing circuit, the hardware timing circuit comprising a first timer and a second timer, the method further comprising:
starting the first timer based on generating the reference signal; and
starting the second timer based on generating the reference signal to generate a sampling start signal, wherein the first digital monitoring sample is determined by a generation of the sampling start signal.

11. The method according to claim 1, wherein the method further comprises at least one of:
generating the monitoring signal based on digital-to-analog converting the digital test signal to an analog test signal, wherein the monitoring signal is coupled into the receiver path downstream of a receiver mixer; or
generating the monitoring signal based on digital-to-analog converting the digital test signal to an analog test signal and mixing the analog test signal with a local oscillator signal,
wherein the monitoring signal is coupled into the receiver path upstream of a receiver mixer.

12. The method according to claim 1, wherein the method further comprises:
generating a further digital test signal, the further digital test signal comprising a further stream of digital test samples, the further stream of digital test samples comprising a second digital test sample;
generating a further monitoring signal based on the further digital test signal;
coupling the further monitoring signal into a further receiver path;
processing the further monitoring signal in the further receiver path to generate a further processed monitoring signal;
generating a further stream of digital monitoring samples representing the further processed monitoring signal; and
determining second information indicating at least one property related to the further receiver path based on a processing of a further set of digital monitoring samples, the further set of digital monitoring samples comprising a second digital monitoring sample of the further stream of digital monitoring samples,
wherein generating of the second digital test sample is synchronized to generating of the first digital test sample, and
wherein generating of the second digital monitoring sample is synchronized to generating of the first digital monitoring sample.

13. The method according to claim 12, the method further comprising comparing the first information with the second information.

14. The method according to claim 1, wherein the first information is at least one of phase information or signal-to-noise information.

15. A semiconductor device, comprising:
a radio frequency (RF) receiver path;
a digital signal generator configured to generate, based on a first signal, a digital test signal, the digital test signal comprising a stream of digital test samples, the stream of digital test samples comprising a first digital test sample;
a monitor signal generator circuit configured to generate a monitoring signal based on the digital test signal;
a coupler configured to couple the monitoring signal into the RF receiver path, wherein the RF receiver path is configured to process the monitoring signal in the RF receiver path and to generate a processed monitoring signal;
a first circuit configured to generate a stream of digital monitoring samples representing the processed monitoring signal;
a processing circuit configured to determine first information indicating at least one property related to the RF receiver path based on processing a set of digital monitoring samples from the stream of digital monitoring samples, the set of digital monitoring samples comprising a first digital monitoring sample of the set of digital monitoring samples; and
a timing circuit configured to control the semiconductor device such that the first digital monitoring sample of the set of digital monitoring samples is generated at a predetermined time duration after generating of the first digital test sample of the stream of digital test samples.

16. The semiconductor device according to claim 15, further comprising a clock circuit to generate a clock signal, wherein the timing circuit is further configured to generate a reference signal based on the first signal; and
wherein the semiconductor device is controlled to generate the first digital test sample of the stream of digital test samples concurrently with or a predetermined first number of clock cycles of the clock signal after generating the reference signal and to generate the first digital monitoring sample a predetermined second number of clock cycles of the clock signal after generating the reference signal.

17. The semiconductor device according to claim 15, further comprising a programmable memory configured to store information, wherein the timing circuit is configured to determine a predetermined first number of clock cycles and a predetermined second number of clock cycles based on the stored information.

18. The semiconductor device according to claim 15, wherein the first circuit comprises a decimation filter, wherein the timing circuit is configured to generate a filter reset signal for resetting the decimation filter to define a time instant at which the first digital monitoring sample is generated; and
wherein the decimation filter is configured to receive, after resetting the decimation filter, a stream of digital receiver samples, the stream of digital receiver samples representing the processed monitoring signal and to decimate the stream of digital receiver samples to generate the stream of digital monitoring samples.

19. The semiconductor device according to claim 18, wherein the decimation filter is clocked with a clock signal, wherein the filter reset signal is generated concurrently with or a predetermined number of clock cycles of the clock signal after generating a reference signal.

20. The semiconductor device according to claim 16, further comprising firmware to generate the first signal for starting a receiver monitoring, and wherein the timing circuit comprises a first timer and a second timer, wherein the timing circuit is configured to start the first timer based on generating the reference signal and to start the second timer based on generating the reference signal to generate a sampling start signal, wherein the first digital monitoring sample is determined by a generation of the sampling start signal.

21. The semiconductor device according to claim 15, further comprising a further RF receiver path,
wherein the digital signal generator is configured to generate a further digital test signal, the further digital test signal comprising a further stream of digital test samples, the further stream of digital test samples comprising a second digital test sample,
wherein the monitor signal generator circuit is configured to generate a further monitoring signal based on the further digital test signal,
the semiconductor device further comprising a further coupler to couple the further monitoring signal into the further RF receiver path, wherein the further RF receiver path is configured to process the further monitoring signal in the further RF receiver path to generate a further processed monitoring signal,
wherein the first circuit is further configured to generate a further stream of digital monitoring samples representing the further processed monitoring signal,
wherein the processing circuit is configured to determine second information indicating at least one property related to the further RF receiver path based on processing a further set of digital monitoring samples from the further stream of digital monitoring samples, the set of digital monitoring samples comprising a second digital monitoring sample of the further stream of digital monitoring samples, and
wherein the timing circuit is configured to control the digital signal generator such that generating the second digital test sample is synchronized to the generating of the first digital test sample and generating of the second digital monitoring sample is synchronized to the generating of the first digital monitoring sample.

* * * * *